J. B. KENNY.
BASKET HANDLE AND COVER FASTENER.
APPLICATION FILED DEC. 27, 1910.
1,019,801.
Patented Mar. 12, 1912.
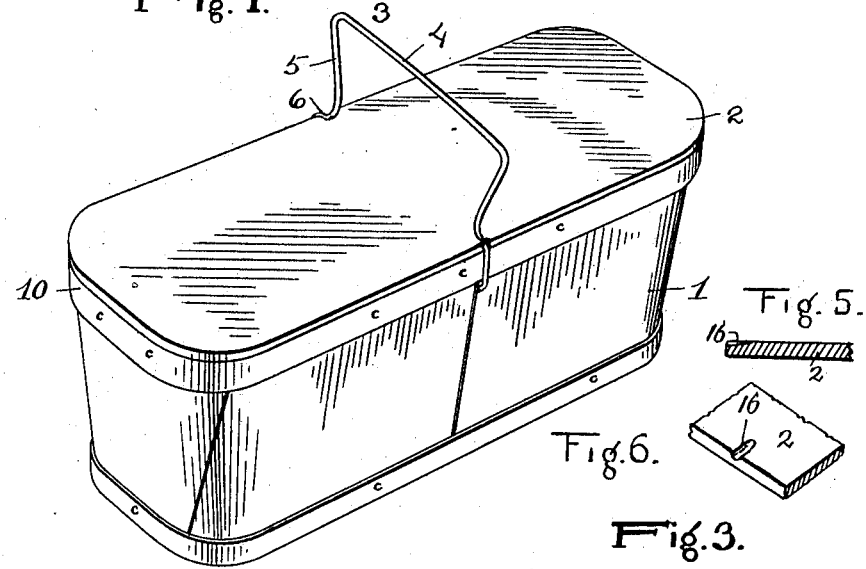
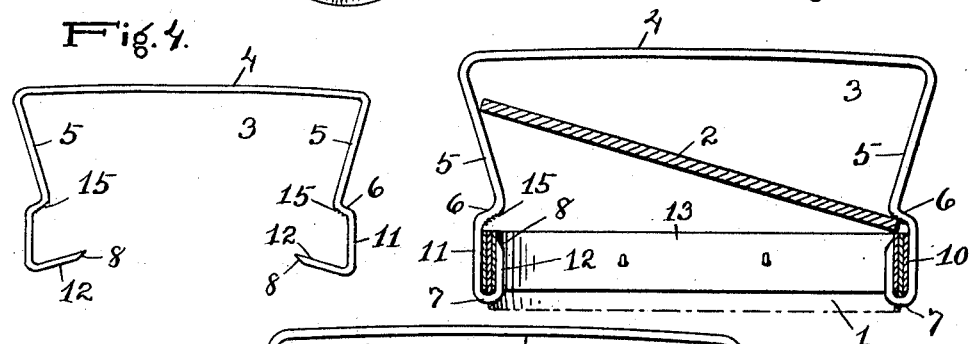
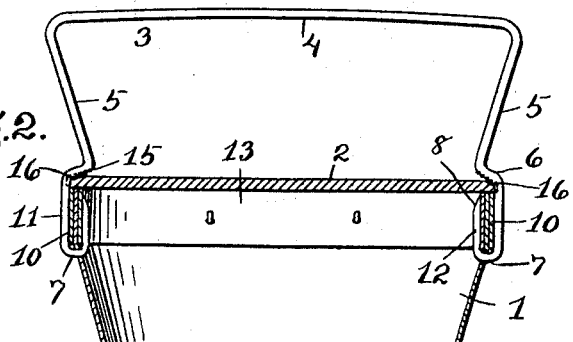
Witnesses
Stuart Hilder.
Frances W. Anderson.
Inventor,
John B. Kenny,
by E. W. Anderson & Son
his Attorneys

UNITED STATES PATENT OFFICE.

JOHN B. KENNY, OF GENEVA, NEW YORK.

BASKET HANDLE AND COVER-FASTENER.

1,019,801.  Specification of Letters Patent.  Patented Mar. 12, 1912.

Application filed December 27, 1910. Serial No. 599,612.

*To all whom it may concern:*

Be it known that I, JOHN B. KENNY, a citizen of the United States, resident of Geneva, in the county of Ontario and State of New York, have made a certain new and useful Invention in Basket Handles and Cover-Fasteners; and I declare the following to be a full clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied. Fig. 2 is a central cross section of the basket having the invention applied thereto. Fig. 3 is a similar view of the upper portion of the basket with the cover shown as raised at one side. Fig. 4 is a detail view of the handle and cover fastener before it is applied to the basket. Fig. 5 is a detail cross section of one side of the cover taken through the groove. Fig. 6 is a detail fragmentary view of a portion of the cover, showing the groove.

The invention has relation to improvements in fruit and similar baskets, having particular reference to the handle of the basket and embodying improvements upon the invention of my Patent Number 849,402, granted April 9, 1907.

The invention consists in the novel construction and combinations of parts, as hereinafter set forth.

In the accompanying drawings, illustrating the invention, the numeral 1 designates a fruit basket of the ordinary character, 2 is the cover, and 3 is the handle.

The handle 3 is made of a single piece of resilient wire and consists of a transversely arranged grip portion 4, provided with downward bent lateral spring portions 5, 5, outward bent inclined shoulder portions or bends 6, 6 at the lower ends of said lateral portions, and terminal loops 7, 7, the pointed ends 8, 8 of which are engaged with the sides of the basket just below the upper reinforcing strip 10 thereof, to perforate said sides, the outer lateral arm 11 of each loop closely engaging said reinforcing strip and the inner lateral loop arm 12 being bent upward into close engagement with the inner wall of the basket or with an inner reinforcing top strip 13 thereof, with its end 8 located below the upper edge of the basket, or it may be about on a level with said edge, the pointed ends 8 of the inner lateral arms of the loops lying entirely within said shoulder bends, whereby these pointed ends are guarded and the hands of the person filling or removing fruit from the basket are prevented from becoming injured.

It is found in practice that the pointed spurs which project above the top of the basket into engagement with the lower face of the cover, as provided for in my patent, are objectionable in that they are liable to come in contact with the hands of the person filling the basket with fruit or removing fruit from the basket, and in order to avoid this objection I dispense with said spurs and in place thereof provide the lower surface of the inclined shoulders 6, 6 of the handle with sharp teeth 15, which are inclined inward with respect to said shoulders and to the basket in order to have a sawing or grooving engagement with the cover, to form a central groove or depression 16 in the top of each longitudinal edge or margin of the cover when it is sprung into position upon the basket beneath the shoulders, said teeth being located within and guarded from being brought into contact with the hands of the person filling the basket or removing fruit from the basket by said shoulder bends. That is to say, the cover being slid into position upon the basket upon an incline within the handle, and engaged under the oblique shoulder 5 at one side, as shown in Fig. 3 of the drawings, is now forced down at its raised side, which will cause the elastic lateral portion of the handle at this side to yield outwardly, when the cover will pass to closed position under the oblique shoulders in such wise that the sharp inward inclined teeth of the shoulders will be forced by the lateral spring portions of the handle to form the grooves or depressions 16, 16, in the upper surface thereof. The formation of the grooves in the cover is dependent upon the spring character of the lateral portions 5, 5 of the handle, which causes the oblique shoulders to bear strongly downward upon the cover, which is gripped between these shoulders and the upper edge of the basket, the grooving engagement of the shoulders with the cover being designed to prevent endwise movement of the cover upon the basket, which would expose the fruit contained therein.

The cover may be readily raised at one side from engagement with the handle shoulders by springing it upward at one side, in the manner as described for its engagement with said shoulders, the operation being reversed; when the contents of the basket will be exposed to view for examination. And when one side of the cover is raised in this manner, the cover may be slid outward within the handle to enable the purchaser to use the contents.

My invention is a valuable improvement upon the device of my patent referred to in that the cover will be effectually secured against endwise movement upon the basket without liability of injury to the hands of the person filling the basket or of the purchaser removing fruit from the basket.

Having thus described my invention, what I claim as new and desire to secure by Letters Patent is:

1. The combination with a fruit basket and cover therefor, of a handle and cover fastener formed of a single piece of resilient wire, comprising a transverse grip, downward extending lateral arms, outward extending shoulders, and terminal loops having upturned ends engaging the sides of the basket, said shoulders being separated from the top edge of the basket by intervals and having toothed lower surfaces guarded by said arms, and adapted to automatically form a groove in the marginal top surface of said cover to hold the cover against endwise movement.

2. As a new article of manufacture, a handle and cover fastener for fruit baskets, formed of a single piece of resilient wire and comprising a transverse grip, downward extending lateral arms, outward extending shoulders and terminal loops, said shoulders having toothed lower surfaces guarded by said arms.

In testimony whereof I affix my signature, in presence of two witnesses.

JOHN B. KENNY.

Witnesses:
MARY KENNY,
JOHN J. CHARTRES.

---

Copies of this patent may be obtained for five cents each, by addressing the "Commissioner of Patents, Washington, D. C."